(12) United States Patent  
Kubota et al.

(10) Patent No.: US 8,427,759 B2
(45) Date of Patent: Apr. 23, 2013

(54) IMAGING LENS

(75) Inventors: Yoji Kubota, Nagano (JP); Kenichi Kubota, Nagano (JP); Hitoshi Hirano, Nagano (JP); Ichiro Kurihara, Tochigi (JP); Yoshio Ise, Tochigi (JP)

(73) Assignees: Optical Logic Inc., Nagano (JP); Kantatsu Co., Ltd., Tochigi (JP)

( * ) Notice: Subject to any disclaimer, the term of this patent is extended or adjusted under 35 U.S.C. 154(b) by 144 days.

(21) Appl. No.: 13/086,925

(22) Filed: Apr. 14, 2011

(65) Prior Publication Data

US 2011/0279911 A1 Nov. 17, 2011

Related U.S. Application Data

(60) Provisional application No. 61/334,628, filed on May 14, 2010.

(51) Int. Cl.
*G02B 3/02* (2006.01)
*G02B 9/12* (2006.01)
*H04N 5/225* (2006.01)

(52) U.S. Cl.
USPC .............................. 359/716; 359/784; 348/340

(58) Field of Classification Search .................. 348/340; 359/715, 716, 784
See application file for complete search history.

(56) References Cited

U.S. PATENT DOCUMENTS 7,602,560 B2 * 10/2009 Kawasaki ...................... 359/785
8,164,840 B2 * 4/2012 Chen et al. .................... 359/784

FOREIGN PATENT DOCUMENTS

JP 2008-076594 A 4/2008
TW 099114919 * 5/2010

* cited by examiner

*Primary Examiner* — David N Spector
(74) *Attorney, Agent, or Firm* — Kubotera & Associates, LLC

(57) ABSTRACT

An imaging lens includes a first lens having positive curvature radii on both an object side and an image side, a second lens having a concave shape on both sides, and a third lens having positive curvature radii on both the object side and the image side. The first to third lenses are arranged in this order from the object side toward the image side. When a whole lens system has a focal length f, the first lens has a focal length f1, the second lens has a focal length f2, and the third lens has a focal length f3, the following conditional expressions are satisfied:

$f1 < |f2|$ $f1 < |f3|$ $0.5 < f1/f < 1.0$.

18 Claims, 15 Drawing Sheets

IMAGING LENS

CROSS-REFERENCE TO RELATED APPLICATIONS

The application claims the benefit under 35 U.S.C. 119(e) of the provisional application No. 61/334,628, filed on May 14, 2010.

BACKGROUND OF THE INVENTION AND RELATED ART STATEMENT

The present invention relates to an imaging lens for forming an image on an imaging element such as a CCD sensor and a CMOS sensor. In particular, the present invention relates to an imaging lens suitable for mounting in a relatively small camera such as a cellular phone, a digital still camera, a portable information terminal, a security camera, an onboard camera, and a network camera.

An imaging lens to be mounted in a small camera has been required to have a high-resolution lens configuration suitable for a recently developed imaging element with a higher resolution, as well as to have a smaller size. Conventionally, various lens configurations have been proposed. Among the various lens configurations, a configuration formed of three lenses has been suitable for miniaturization and easy to correct various aberrations properly, and has been applied to many cameras.

An imaging lens disclosed in Patent Reference has been known as an imaging lens having such a three-lens configuration. The imaging lens disclosed in Patent Reference includes a first lens having positive refractive power; a second lens having negative refractive power; and a third lens having positive refractive power arranged in this order from an object side. In the configuration, the third lens has a shorter focal length relative to that of a whole lens system, that is, the third lens has relatively strong refractive power. Further, the first lens has refractive power stronger than that of the second lens. Accordingly, it is possible to correct a field curvature or coma aberration.

Patent Reference: Japanese Patent Application Publication No. 2008-76594

In recent years, miniaturization and resolution increase of cellular phones and cameras have been rapidly advanced, and even an imaging lens has been increasingly required to have more advanced performances than before. The imaging lens disclosed in Patent Reference has been known to properly correct aberration. However, the lens system has a relatively long focal length. Accordingly, it is difficult to reduce a distance of an optical axis from a surface of the first lens on the object side to an image plane. Therefore, it is difficult to achieve both miniaturization and satisfactory aberration correction.

In view of the problems of the conventional techniques described above, an object of the present invention is to provide an imaging lens with a small size capable of properly correcting aberration.

SUMMARY OF THE INVENTION

In order attain the objects described above, according to the present invention, an imaging lens includes a first lens having positive refractive power; a second lens having negative refractive power; and a third lens arranged in an order from an object side to an image side. The first lens is formed in a shape so that both a curvature radius of a surface thereof on the object side and a curvature radius of a surface thereof on the image side are positive. The second lens is formed in a shape so that a curvature radius of a surface thereof on the object side is negative and a curvature radius of a surface thereof on the image side is positive. The third lens is formed in a shape so that both a curvature radius of a surface thereof on the object side and a curvature radius of a surface thereof on the image side are positive. Further, when the whole lens system has a focal length f, the first lens has a focal length f1, the second lens has a focal length f2, and the third lens has a focal length f3, the imaging lens satisfies the following conditional expressions (1), (2), and (3):

$$f1 < |f2| \tag{1}$$

$$f1 < |f3| \tag{2}$$

$$0.5 < f1/f < 1.0 \tag{3}$$

When the conditional expressions (1) and (2) are satisfied, it is possible to reduce a length (a thickness) of the imaging lens along an optical axis thereof and reduce a size of the imaging lens. As indicated in the conditional expressions, when the first lens has the refractive power stronger than the respective refractive powers of the second lens and the third lens, the refractive power of the whole lens system concentrates mainly the first lens.

According to the invention, the first lens is formed in the shape so that both the curvature radius of the surface thereof on the object side and the curvature radius of the surface thereof on the image side are positive, i.e., the first lens has the shape of a meniscus lens, in which a convex surface thereof faces the object side near the optical axis. For this reason, a position of a principal point of the first lens with the stronger refractive power moves to the object side. Accordingly, a position of a principal point of the whole lens system moves to the object side, so that it is possible to suitably reduce a size of the imaging lens.

Furthermore, according to the invention, the curvature radius of the surface of the third lens on the object side is positive, i.e., the third lens has the shape with a convex surface thereof facing the object side. In this case, there may be a concern that a distance between the second lens and the third lens on the optical axis could be long, depending on the shape of the surface of the second lens on the image side.

To this end, according to the invention, the second lens is formed in the shape so that the curvature radius of the surface thereof on the object side is negative and the curvature radius of the surface thereof on the image side is positive, i.e., a shape of a biconcave lens near the optical axis. Accordingly, it is possible to avoid an increase in the distance between the second lens and the third lens on the optical axis, thereby making it possible to more efficiently reduce a size of the imaging lens.

When the conditional expression (3) is satisfied, it is possible to keep the field curvature within a satisfactory range while configuring a small-sized imaging lens. When the value exceeds the upper limit 1.0, the refractive power of the first lens decreases in relative to that of the whole lens system, so that it is difficult to reduce the thickness of the imaging lens. In addition, since the refractive powers of the second lens and the third lens increases in relative to that of the first lens, it is difficult to keep the field curvature within the satisfactory range.

On the other hand, when the value is below the lower limit 0.5, the refractive power of the first lens increases in relative to that of the whole lens system. Accordingly, although it is preferred for reducing the size of the imaging lens, a back focal length tends to be shortened. Generally, it is common to place an insert such as infrared cut filter or a cover glass between a lens system such as the imaging lens of the invention and an image plane of an imaging element. When the back focal length becomes short, it is difficult to secure a space to put such an insert therein. In addition, when the refractive power of the first lens increases relatively, an image plane tends to tilt toward the object side, so that it is difficult to secure good imaging performance.

When the conditional expressions (1) through (3) are satisfied, it is possible to concurrently achieve a smaller size of the imaging lens and satisfactory aberration correction.

According to the invention, in the imaging lens with the configuration described above, when a composite focal length of the second lens and the third lens is f23, it is preferred to satisfy the following conditional expression (4a) when the refractive power of the third lens is positive, and to satisfy the following conditional expression (4b) when the refractive power of the third lens is negative:

$$-1.5<f23/f3<-0.8 \quad (4a)$$

$$0.5<f23/f3<1.2 \quad (4b)$$

When the conditional expressions (4a) and (4b) are satisfied, it is possible to restrain axial and off-axis chromatic aberrations within a satisfactory range while restraining incident angles of light beams emitted from the imaging lens to the imaging element within a certain range.

As well known, in order for an imaging element to receive a light beam, an incident angle of the light beam needs to be below a maximum incident angle according to a structure of the imaging element. When the light beam outside the range of the maximum incident angle enters the imaging element, a resultant image tends to have a dark periphery due to a shading phenomenon. Accordingly, it is necessary to restrain the incident angle of the light beam emitted from the imaging lens to the imaging element within a certain range.

When the value exceeds the upper limit of the conditional expression (4a), or when the value is below the lower limit of the conditional expression (4b), the refractive power of the third lens decreases relatively. Accordingly, it is easy to restrain the axial and off-axis chromatic aberrations within satisfactory ranges, and it is difficult to restrain the incident angles of light beams that are emitted from the imaging lens to the imaging element within the certain range.

On the other hand, when the value is below the lower limit of the conditional expression (4a), or when the value exceeds the upper limit of the conditional expression (4b), the refractive power of the third lens increases relatively. Accordingly, it is easy to restrain the incident angles of light beams that are emitted from the imaging lens to the imaging element within the certain range, and it is difficult to sufficiently correct the axial and off-axis chromatic aberrations (that of a short wavelength increases in a minus direction in relative to that of a reference wavelength). Therefore, it is difficult to achieve a good imaging performance.

According to the invention, in the imaging lens with the configuration described above, it is preferred to further satisfy the following conditional expression (5):

$$-1.0<f1/f2<-0.5 \quad (5)$$

When the conditional expression (5) is satisfied, it is possible to restrain the axial chromatic aberration, the off-axis chromatic aberration of magnification, and the field curvature within satisfactory ranges, while reducing the thickness of the imaging lens.

When the value exceeds the upper limit −0.5, although it is effective to reduce the thickness of the imaging lens, it is difficult to sufficiently correct the axial chromatic aberration (that of a short wavelength increases in the minus direction in relative to that of a reference wavelength). Further, it is difficult to sufficiently correct the off-axis chromatic aberration of magnification. In addition, the image surface tilts to the object side. Therefore, it is difficult to obtain good imaging performance.

On the other hand, when the value is below the lower limit −1.0, the off-axis chromatic aberration of magnification becomes excessively corrected (that of a short wavelength increases in a plus direction in relative to that of a reference wavelength). Further, the image surface tilts to the image side. Accordingly, it is difficult to obtain good imaging performance.

According to the invention, in the imaging lens with the configuration described above, when the curvature radius of the surface of the second lens on the object side is Rf and the curvature radius of the surface thereof on the image side is Rr, it is preferred to satisfy the following conditional expression (6):

$$-0.30<Rf/Rr<0 \quad (6)$$

When the conditional expression (6) is satisfied, it is possible to restrain the aberration within a satisfactory range while reducing the thickness of the imaging lens. When the value exceeds the upper limit 0, since the position of the principal point of the lens system moves towards the image side, it is difficult to configure a small-sized imaging lens.

On the other hand, when the value is below the lower limit −0.30, since the position of the principal point of the lens system moves towards the object side, although it is advantageous to achieve a smaller size of an imaging lens, the image surface is excessively corrected (increased in the plus direction). In addition, since the outward coma aberration also increases, it is difficult to obtain good imaging performance with corrected aberration.

According to the invention, in the imaging lens with the configuration described above, when the distance between the first lens and the second lens on an optical axis is dA and the distance between the second lens and the third lens on an optical axis is dB, it is preferred to satisfy the following conditional expression (7):

$$0.25<dA/dB<0.7 \quad (7)$$

When the conditional expression (7) is satisfied, it is possible to restrain the spherical aberration and the coma aberration within satisfactory ranges. When the second lens is arranged in a range defined with the conditional expression (7), it is possible to restrain the spherical aberration and the coma aberration within satisfactory ranges.

When the value exceeds the upper limit 0.7, the spherical aberration is excessively corrected, and the axial chromatic aberration becomes insufficiently corrected. In addition, the inward coma aberration by an off-axis light beam increases and it is difficult to restrain the aberration within a satisfactory range.

On the other hand, when the value is below the lower limit 0.25, the spherical aberration becomes insufficiently corrected and the outward coma aberration by an off-axis light beam becomes increased. Therefore, even in this case, it is difficult to restrain each aberration within a satisfactory range.

According to the invention, in the imaging lens with the configuration described above, it is preferred to satisfy the following conditional expression (7A) in order to restrain the spherical aberration and the coma aberration within more satisfactory ranges:

$$0.3<dA/dB<0.65 \quad (7A)$$

According to the imaging lens of the invention, it is possible to both reduce the size of the imaging lens and correct the aberration properly, thereby making it possible to provide the imaging lens with the small size capable of correcting aberrations properly.

DETAILED DESCRIPTION OF PREFERRED EMBODIMENTS

First Embodiment

Hereunder, referring to the accompanying drawings, a first embodiment that represents the invention will be fully described.

Figure 1:
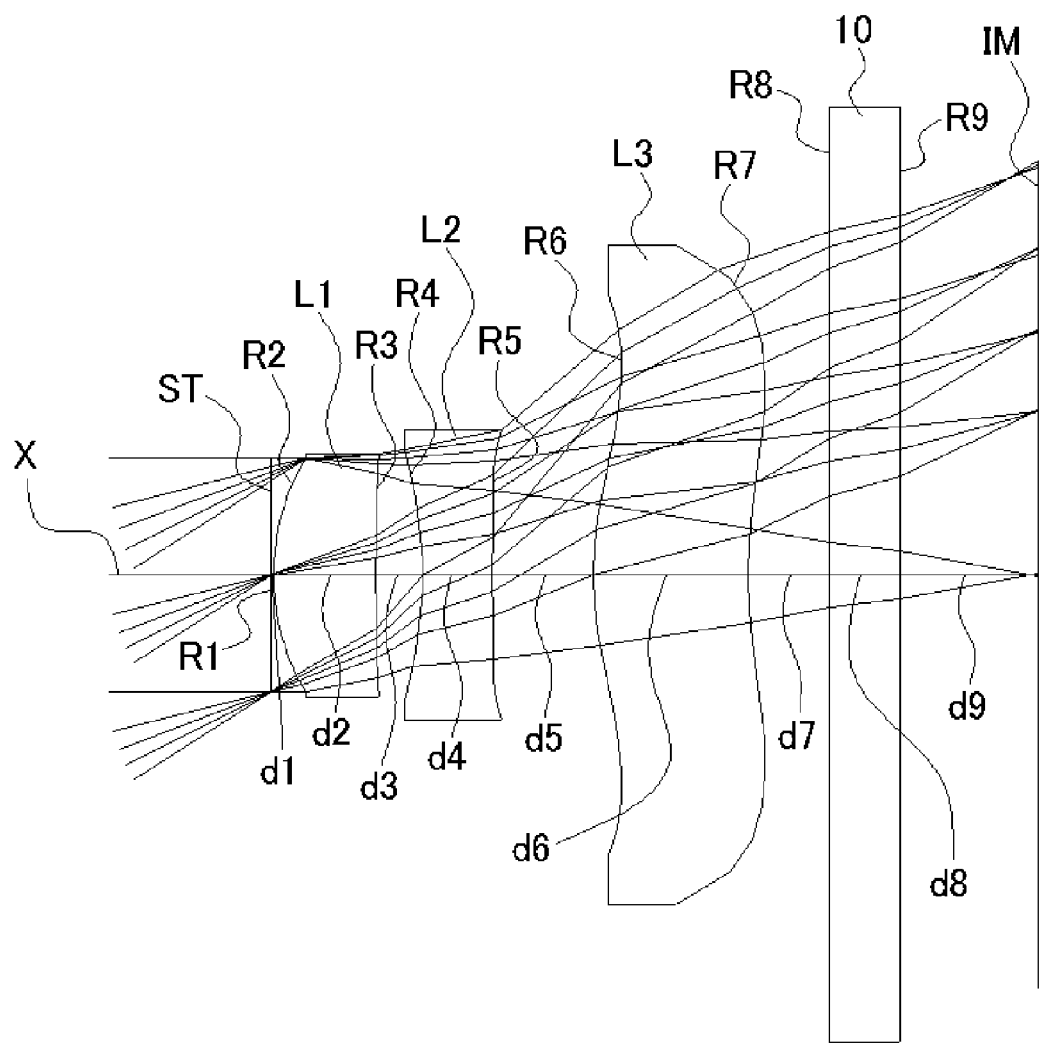
FIG. 1 is a schematic sectional view showing a configuration of an imaging lens in Numerical Data Example 1.
Figure 4:
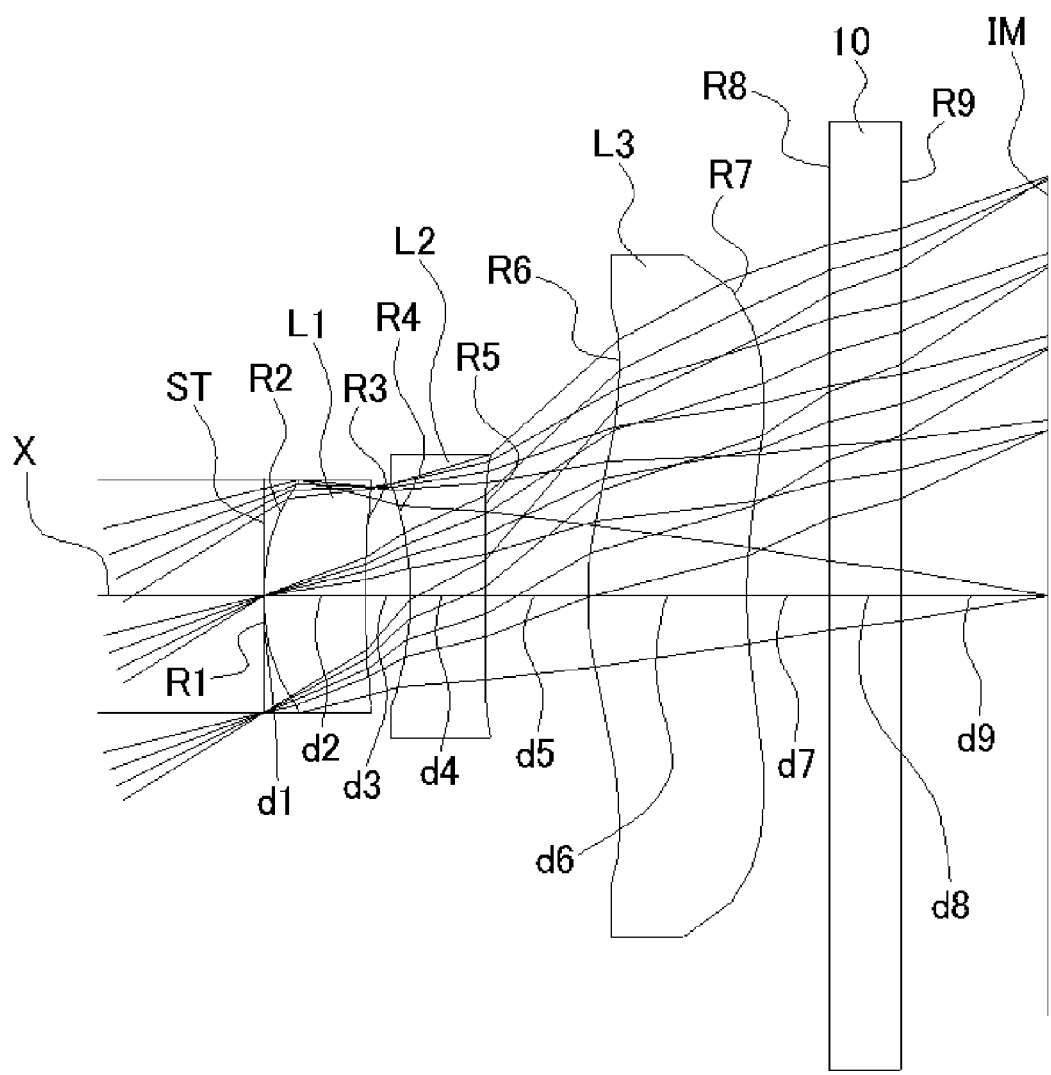
FIG. 4 is a schematic sectional view showing a configuration of an imaging lens in Numerical Data Example 2.
Figure 7:
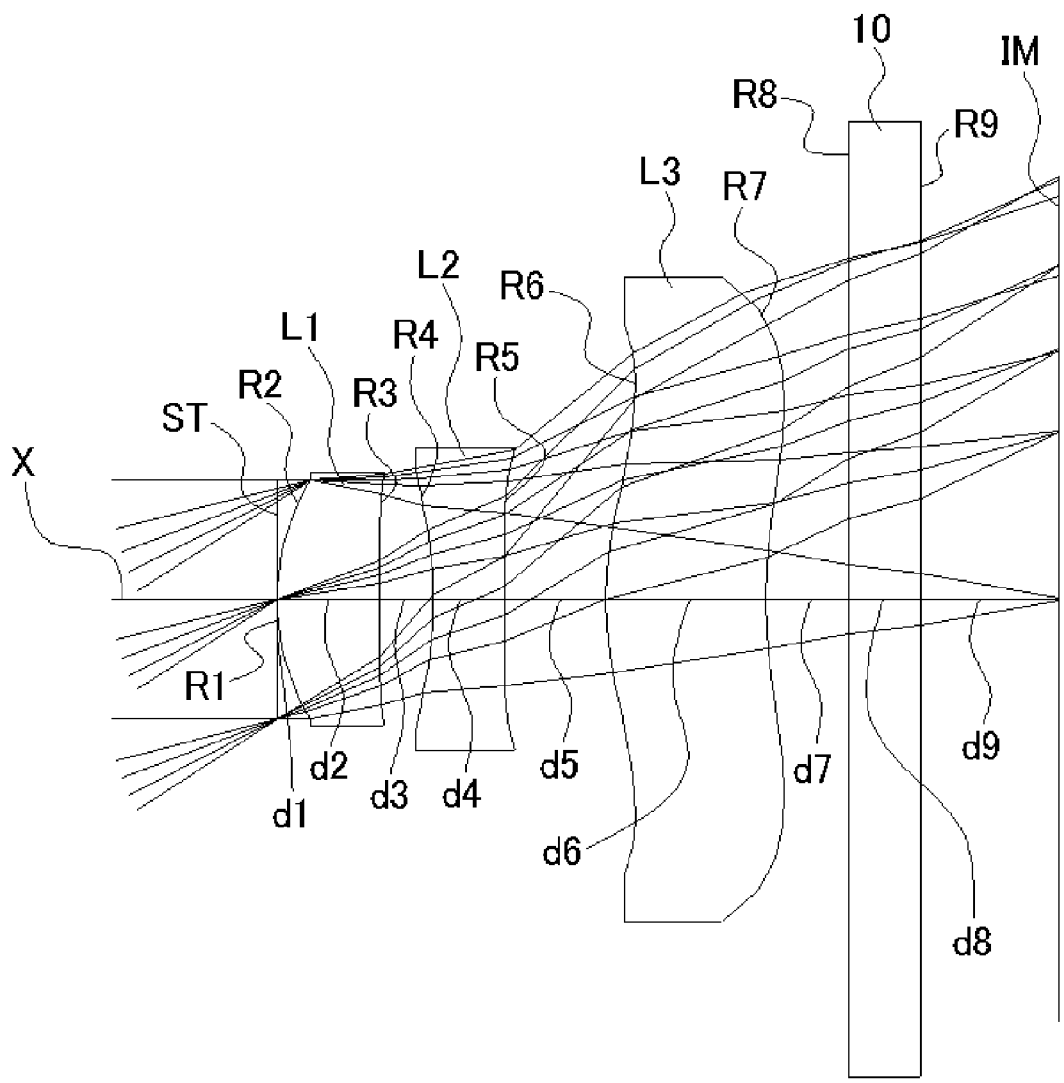
FIG. 7 is a schematic sectional view showing a configuration of an imaging lens in Numerical Data Example 3.

FIGS. 1, 4, and 7 are schematic sectional views showing image lenses in Numerical Data Examples 1 to 3 according to the embodiment, respectively. Since a basic lens configuration is the same among the Numerical Data Examples 1 to 3, the lens configuration of the embodiments will be described with reference to the lens sectional view of Numerical Data Example 1.

As shown in FIG. 1, the imaging lens of the embodiment has an aperture stop ST, a first lens L1 having positive refractive power, a second lens L2 having negative refractive power, and a third lens L3 having positive refractive power, which are arranged in this order from an object side to an image side of the imaging lens. A cover glass 10 is provided between the third lens L3 and an image plane IM of an imaging element. It is noted that the cover glass 10 may be optionally omitted.

The first lens L1 is formed in a shape so that both a curvature radius of a surface thereof on the object side and a curvature radius of a surface thereof on the image side are positive, i.e. it is shaped to form a meniscus lens that directs a convex surface to the object side near an optical axis X. The second lens L2 has a shape, such that a curvature radius of a surface thereof on the object side is negative and a curvature radius of a surface thereof on the image side is positive, i.e., it is shaped to form a biconcave lens near the optical axis X.

The third lens L3 is formed in a shape so that both a curvature radius of a surface thereof on the object side and a curvature radius of a surface thereof on the image side are positive, i.e., it is shaped to form a meniscus lens that directs a convex surface to the object side near the optical axis X. Here, according to the embodiment, the third lens L3 has an aspheric shape, in which both surfaces on the object side and surface on the image side are convex on the object side near the optical axis X and has a concave shape on the object side at periphery thereof.

In the embodiment, all of the lens surfaces of the first lens L1 through the third lens L3 are formed to be aspheric surfaces. When the aspheric surface applied to the lens surfaces have an axis Z in the optical axis direction, a height H in a direction perpendicular to the optical axis, a conical coefficient k, and the aspheric coefficients $A_4, A_6, A_8, A_{10}, A_{12}, A_{14}$, and $A_{16}$, the aspheric surfaces of the lens surfaces may be expressed as follows (which is the same even in a second embodiment that will be described later):

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$ [Formula 1]

When the whole lens system has a focal length f, the first lens L1 has a focal length f1, the second lens has a focal length f2, the third lens L3 has a focal length f3, a composite focal length of the second lens L2 and the third lens L3 is f23, a curvature radius of a surface of the second lens L2 on the object side is Rf, a curvature radius of a surface of the second lens L2 on the image side is Rr, a distance between the first lens L1 and the second lens L2 on an optical axis is dA, and a distance between the second lens L2 and the third lens L3 on an optical axis is dB, the imaging lens of the embodiment satisfies the following conditional expressions:

$f1 < |f2|$ (1)

$f1 < |f3|$ (2)

$0.5 < f1/f < 1.0$ (3)

$-1.5 < f23/f3 < -0.8$ (4a)

$-1.0 < f1/f2 < -0.5$ (5)

$-0.30 < Rf/Rr < 0$ (6)

$0.25 < dA/dB < 0.7$ (7)

$0.3 < dA/dB < 0.65$ (7A)

Here, it is not necessary to satisfy all of the above conditional expressions (1) to (7A). When any single one of the conditional expressions (1) to (7A) is individually satisfied, it is possible to obtain an effect corresponding to the respective conditional expression. Further, it is possible to configure a smaller imaging lens with satisfactorily corrected aberration in comparison with a conventional imaging lens.

Next, Numerical Data Examples of the embodiment will be described. In each of the Numerical Data Examples, f represents a focal length of a whole lens system, Fno represents an F number, and ω represents a half angle of view, respectively. In addition, i represents a surface number counted from the object side, R represents a curvature radius, d represents a distance between lens surfaces (an on-axis surface spacing) along the optical axis X, Nd represents a refractive index for a d line, and vd represents Abbe's number for the d line. Here, aspheric surfaces are indicated with surface numbers affixed with * (asterisk) (which is the same even in the second embodiment that will be described later).

Numerical Data Example 1

Basic lens data are shown below.

f = 2.778 mm, Fno = 2.781, ω = 32.21°
Surface Data

Unit: mm

| Surface number i | R | d | Nd | vd |
|---|---|---|---|---|
| (Object) | ∞ | ∞ | | |
| 1 (Stop) | ∞ | 0.0101 | | |
| 2* | 0.991 | 0.4377 | 1.52470 | 56.2 |
| 3* | 11.252 | 0.2000 (=dA) | | |
| 4* | −1.888 (=Rf) | 0.2995 | 1.61420 | 26.0 |
| 5* | 12.583 (=Rr) | 0.4300 (=dB) | | |
| 6* | 1.256 | 0.6616 | 1.52470 | 56.2 |
| 7* | 2.003 | 0.3500 | | |
| 8 | ∞ | 0.3000 | 1.51633 | 64.2 |
| 9 | ∞ | 0.5936 | | |
| (Image Plane IM) | ∞ | | | |

Aspheric Surface Data

Second Surface k = 0.000000, $A_4$ = 7.328630E−02,
$A_6$ = −2.929952E−01, $A_8$ = 9.756204E−01,
Third Surface k = 0.000000, $A_4$ = −1.402649E−01,
$A_6$ = 8.559119E−01, $A_8$ = −1.002302
Fourth Surface k = 0.000000, $A_4$ = −6.915185E−01,
$A_6$ = 5.621113, $A_8$ = −1.574395E+01,
$A_{10}$ = 1.659025E+01, $A_{12}$ = −1.707965
Fifth surface k = 0.000000, $A_4$ = −6.135715E−01,
$A_6$ = 4.249213, $A_8$ = −9.380550,
$A_{10}$ = 1.078944E+01, $A_{12}$ = −3.227468
Sixth Surface k = −9.002869, $A_4$ = −7.304172E−02,
$A_6$ = −3.563316E−01, $A_8$ = 1.145037,
$A_{10}$ = −1.886568, $A_{12}$ = 1.748350,
$A_{14}$ = −8.718579E−01, $A_{16}$ = 1.812686E−01
Seventh Surface k = −1.563085, $A_4$ = −2.460672E−01,
$A_6$ = 9.489244E−02, $A_8$ = −1.609943E−02,
$A_{10}$ = −3.619836E−02, $A_{12}$ = 2.638370E−02,
$A_{14}$ = −5.759371E−03, $A_{16}$ = −3.783857E−04

The focal lengths f1 to f3 of the respective lenses L1 to L3, and a composite focal length f23 of the second lens L2 and the third lens L3 are as follows:

f1=2.041
f2=−2.652
f3=4.919
f23=−5.834

The values of the respective conditional expressions (3) to (7A) are as follows:

$$f1/f = 0.735 \quad (3)$$

$$f23/f3 = -1.186 \quad (4a)$$

$$f1/f2 = -0.770 \quad (5)$$

$$Rf/Rr = -0.150 \quad (6)$$

$$dA/dB = 0.465 \quad (7),(7A)$$

Accordingly, the imaging lens of Numerical Data Example 1 satisfies the conditional expressions (1) to (7A).

Figure 2:
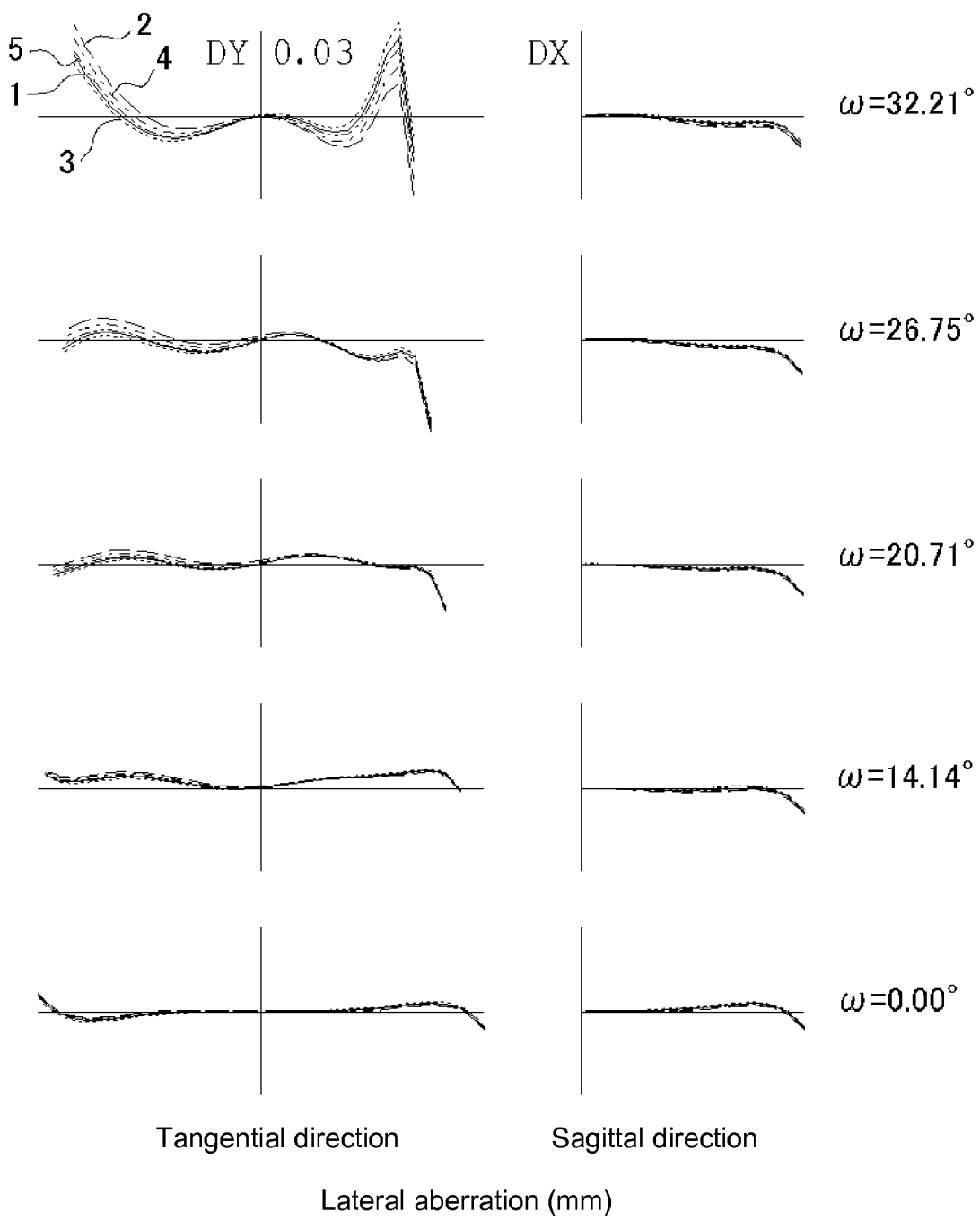
FIG. 2 is an aberration diagram showing a lateral aberration of the imaging lens in FIG. 1.
Figure 3:
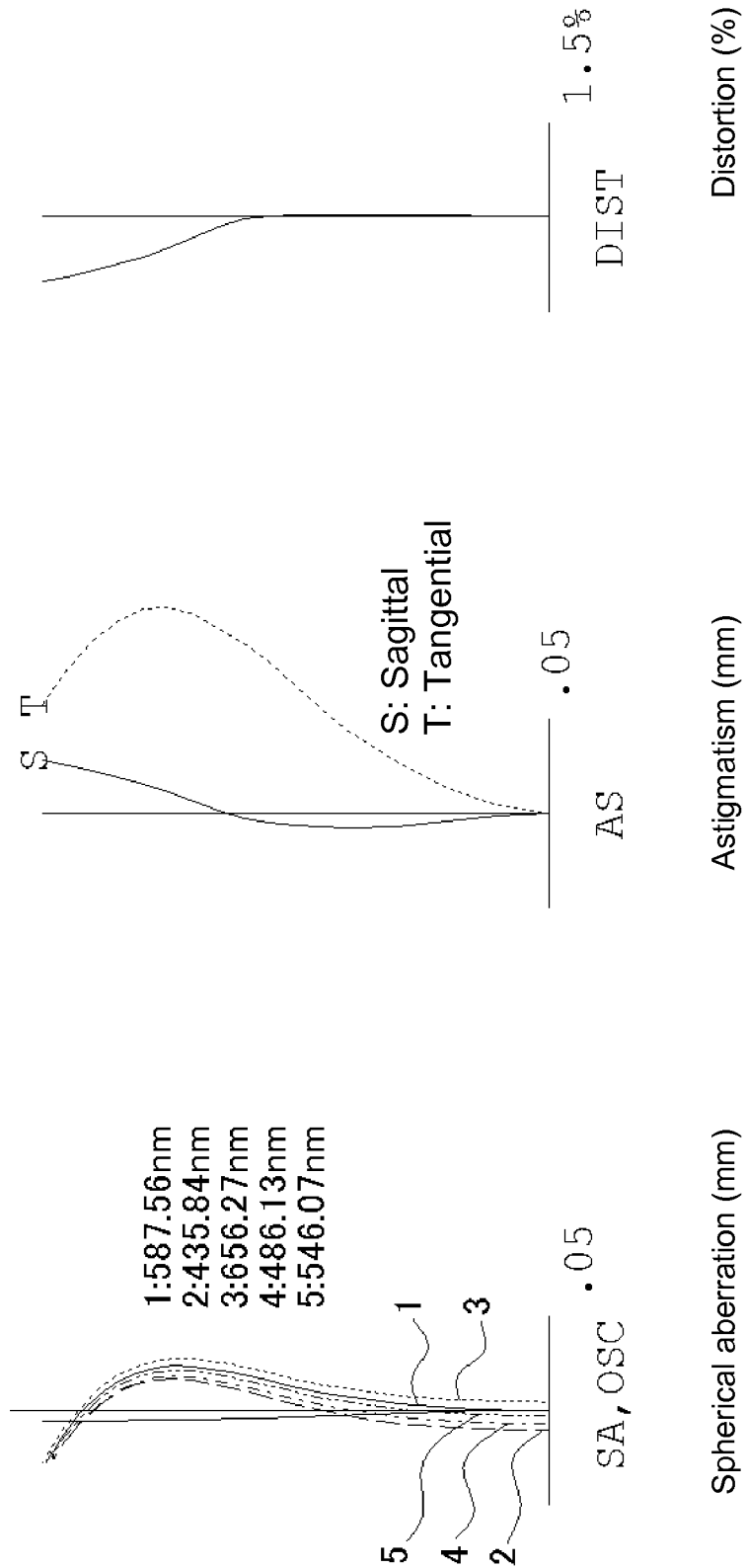
FIG. 3 is an aberration diagram showing a spherical aberration, an astigmatism, and a distortion of the imaging lens in FIG. 1.

FIG. 2 shows the lateral aberration that corresponds to the half angle of view ω in the imaging lens of Numerical Data Example 1 by dividing into a tangential direction and sagittal direction (which is also the same in FIGS. 5, 8, 11, and 14). Furthermore, FIG. 3 shows a spherical aberration SA (mm), an astigmatism AS (mm), and a distortion DIST (%), respectively. In the aberration diagrams, the Offence against the Sine Condition OSC is also indicated for the spherical aberration diagram in addition to the aberrations at the respective wavelengths, 587.56 nm, 435.84 nm, 656.27 nm, 486.13 nm, and 546.07 nm. Further, in the astigmatism diagram, the aberration on the sagittal image surface S and the aberration on the tangential image surface T are respectively indicated (which are the same in FIGS. 6, 9, 12, and 15).

As shown in FIGS. 2 and 3, in the imaging lens of Numerical Data Example 1, the respective aberrations are satisfactorily corrected. In addition, a distance from the surface of the first lens L1 on the object side to the image plane is 3.170 mm in air, and therefore the size of the imaging lens is also suitably reduced.

Numerical Data Example 2

Basic lens data are shown below.

f = 2.845 mm, Fno = 2.904, ω = 31.60°
Surface Data

Unit: mm

| Surface number i | R | d | Nd | vd |
|---|---|---|---|---|
| (Object) | ∞ | ∞ | | |
| 1 (Stop) | ∞ | 0.0000 | | |
| 2* | 0.900 | 0.4300 | 1.52470 | 56.2 |
| 3* | 4.740 | 0.1850 (=dA) | | |
| 4* | −1.780 (=Rf) | 0.3200 | 1.61420 | 26.0 |
| 5* | 15.960 (=Rr) | 0.4300 (=dB) | | |
| 6* | 1.300 | 0.6700 | 1.52470 | 56.2 |
| 7* | 2.130 | 0.3500 | | |
| 8 | ∞ | 0.3000 | 1.51633 | 64.2 |
| 9 | ∞ | 0.6208 | | |
| (Image Plane IM) | ∞ | | | |

-continued f = 2.845 mm, Fno = 2.904, ω = 31.60°
Surface Data

Aspheric Surface Data

Second Surface $k = 1.013885, A_4 = -1.331635E-01,$
$A_6 = 7.683254E-02, A_8 = -1.386429$
Third Surface $k = 0.000000, A_4 = -9.391646E-02,$
$A_6 = 1.435346, A_8 = -3.848211$
Fourth Surface $k = 1.896196, A_4 = -5.575749E-01,$
$A_6 = 3.882751, A_8 = -1.577240E+01,$
$A_{10} = 4.975935E+01, A_{12} = -1.268720E+02$
Fifth Surface $k = 0.000000, A_4 = -5.792134E-01,$
$A_6 = 3.832462, A_8 = -1.006235E+01,$
$A_{10} = 1.788974E+01, A_{12} = -1.464777E+01$
Sixth Surface $k = -2.812535E-01, A_4 = -4.687720E-01,$
$A_6 = 2.145791E-01, A_8 = 5.335429E-03,$
$A_{10} = -5.103890E-02, A_{12} = -1.924959E-02,$
$A_{14} = 1.989603E-02, A_{16} = -2.036795E-03$
Seventh Surface $k = 0.000000, A_4 = -2.036252E-01,$
$A_6 = 3.404486E-03, A_8 = 1.593126E-02,$
$A_{10} = 1.467323E-03, A_{12} = -4.172784E-03$ The focal lengths f1 to f3 of the respective lenses L1 to L3 and the composite focal length f23 of the second lens L2 and the third lens L3 are as follows:

f1=2.039
f2=−2.590
f3=4.976
f23=−5.559

The values of the respective conditional expressions (3) to (7A) are as follows:

$$f1/f=0.717 \quad (3)$$

$$f23/f3=-1.117 \quad (4a)$$

$$f1/f2=-0.787 \quad (5)$$

$$Rf/Rr=-0.112 \quad (6)$$

$$dA/dB=0.430 \quad (7),(7A)$$

Accordingly, the imaging lens of Numerical Data Example 2 satisfies the conditional expressions (1) to (7A).

Figure 5:
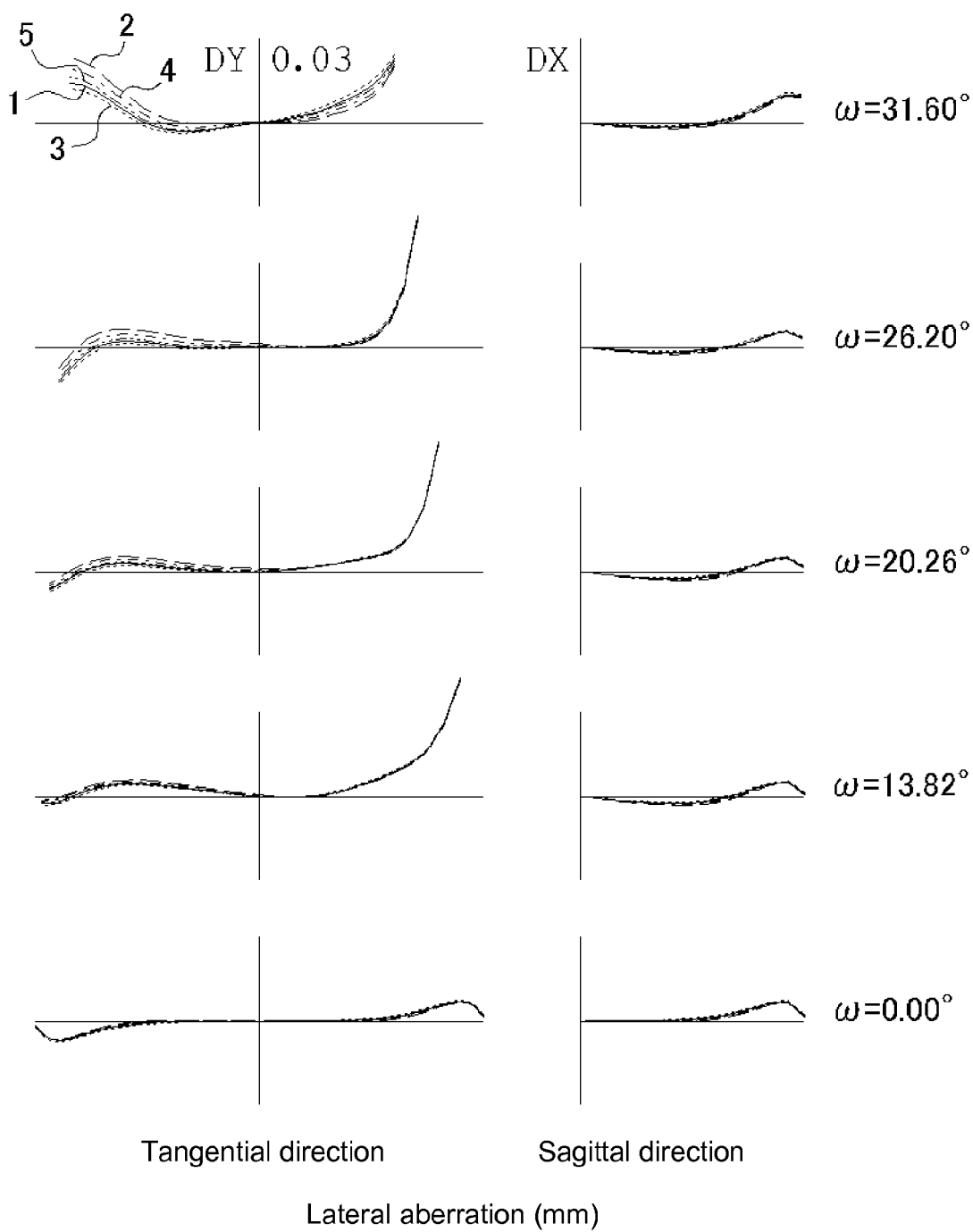
FIG. 5 is an aberration diagram showing a lateral aberration of the imaging lens in FIG. 4.
Figure 6:
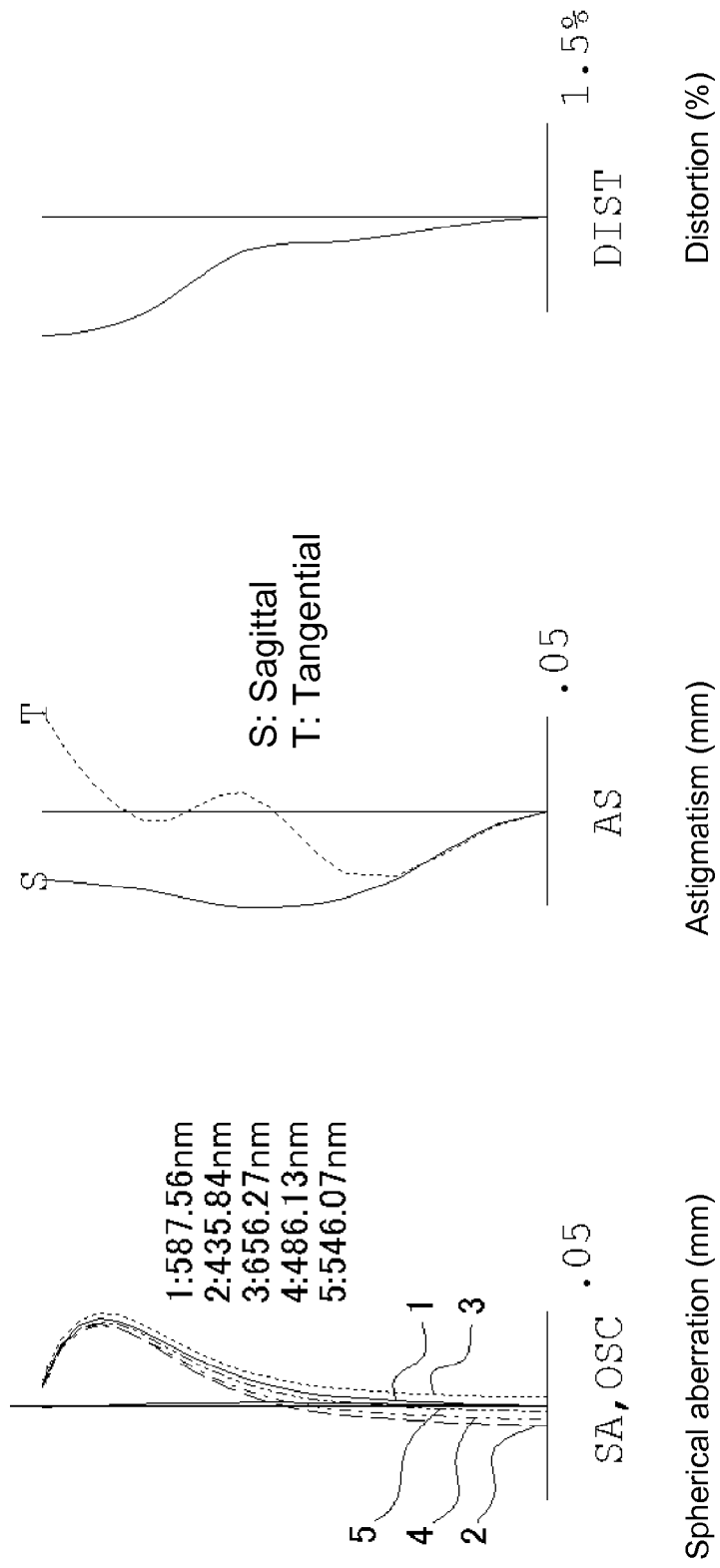
FIG. 6 is an aberration diagram showing a spherical aberration, an astigmatism, and a distortion of the imaging lens in FIG. 4.

FIG. 5 shows the lateral aberration that corresponds to the half angle of view ω in the imaging lens of Numerical Data Example 2, and FIG. 6 shows the spherical aberration SA (mm), the astigmatism AS (mm), and the distortion DIST (%), respectively. As shown in FIGS. 5 and 6, in the imaging lens of Numerical Data Example 2, the respective aberrations are satisfactorily corrected similarly to Numerical Data Example 1. In addition, the distance from the surface of the first lens L1 on the object side to the image plane is 3.204 mm in air, and therefore the size of the imaging lens is suitably reduced.

Numerical Data Example 3
Basic lens data are shown below.

f = 2.784 mm, Fno = 2.786, ω = 32.15°
Surface Data

Unit: mm

| Surface number i | R | d | Nd | vd |
|---|---|---|---|---|
| (Object) | ∞ | ∞ | | |
| 1 (Stop) | ∞ | 0.0000 | | |
| 2* | 1.000 | 0.4250 | 1.52470 | 56.2 |
| 3* | 10.500 | 0.2250 (=dA) | | |
| 4* | −1.950 (=Rf) | 0.3000 | 1.61420 | 26.0 |
| 5* | 13.000 (=Rr) | 0.4200 (=dB) | | |
| 6* | 1.267 | 0.6700 | 1.52470 | 56.2 |
| 7* | 1.975 | 0.3500 | | |
| 8 | ∞ | 0.3000 | 1.51633 | 64.2 |
| 9 | ∞ | 0.5778 | | |
| (Image Plane IM) | ∞ | | | |

Aspheric Surface Data

Second Surface $k = 0.000000, A_4 = -7.576999E-02,$
$A_6 = 8.172900E-01, A_8 = -1.400075$
Third Surface $k = 0.000000, A_4 = -1.328168E-01,$
$A_6 = 1.622385, A_8 = -3.233796$
Fourth Surface $k = 0.000000, A_4 = -5.711823E-01,$
$A_6 = 5.742309, A_8 = -1.719770E+01,$
$A_{10} = 1.750999E+01, A_{12} = 4.502805E-01$
Fifth Surface $k = 0.000000, A_4 = -6.015480E-01,$
$A_6 = 4.288483, A_8 = -9.464158,$
$A_{10} = 9.509792, A_{12} = -1.288798$
Sixth Surface $k = -8.025975, A_4 = -7.341897E-02,$
$A_6 = -3.577822E-01, A_8 = 1.143415,$
$A_{10} = -1.888013, A_{12} = 1.747451,$
$A_{14} = -8.718979E-01, A_{16} = 1.823664E-01$
Seventh Surface $k = -1.243082, A_4 = -2.450392E-01,$
$A_6 = 9.299420E-02, A_8 = -1.694575E-02,$
$A_{10} = -3.649049E-02, A_{12} = 2.631459E-02,$
$A_{14} = -5.742159E-03, A_{16} = -3.280138E-04$ The focal lengths f1 to f3 of the respective lenses L1 to L3 and the composite focal length f23 of the second lens L2 and the third lens L3 are as follows:

f1=2.075
f2=−2.740
f3=5.081
f23=−5.914

The values of the respective conditional expressions (3) to (7A) are as follows:

$$f1/f=0.745 \quad (3)$$

$$f23/f3=-1.164 \quad (4a)$$

$$f1/f2=-0.757 \quad (5)$$

$$Rf/Rr=-0.150 \quad (6)$$

$$dA/dB=0.536 \quad (7),(7A)$$

Accordingly, the imaging lens of Numerical Data Example 3 satisfies the conditional expressions (1) to (7A).

Figure 8:
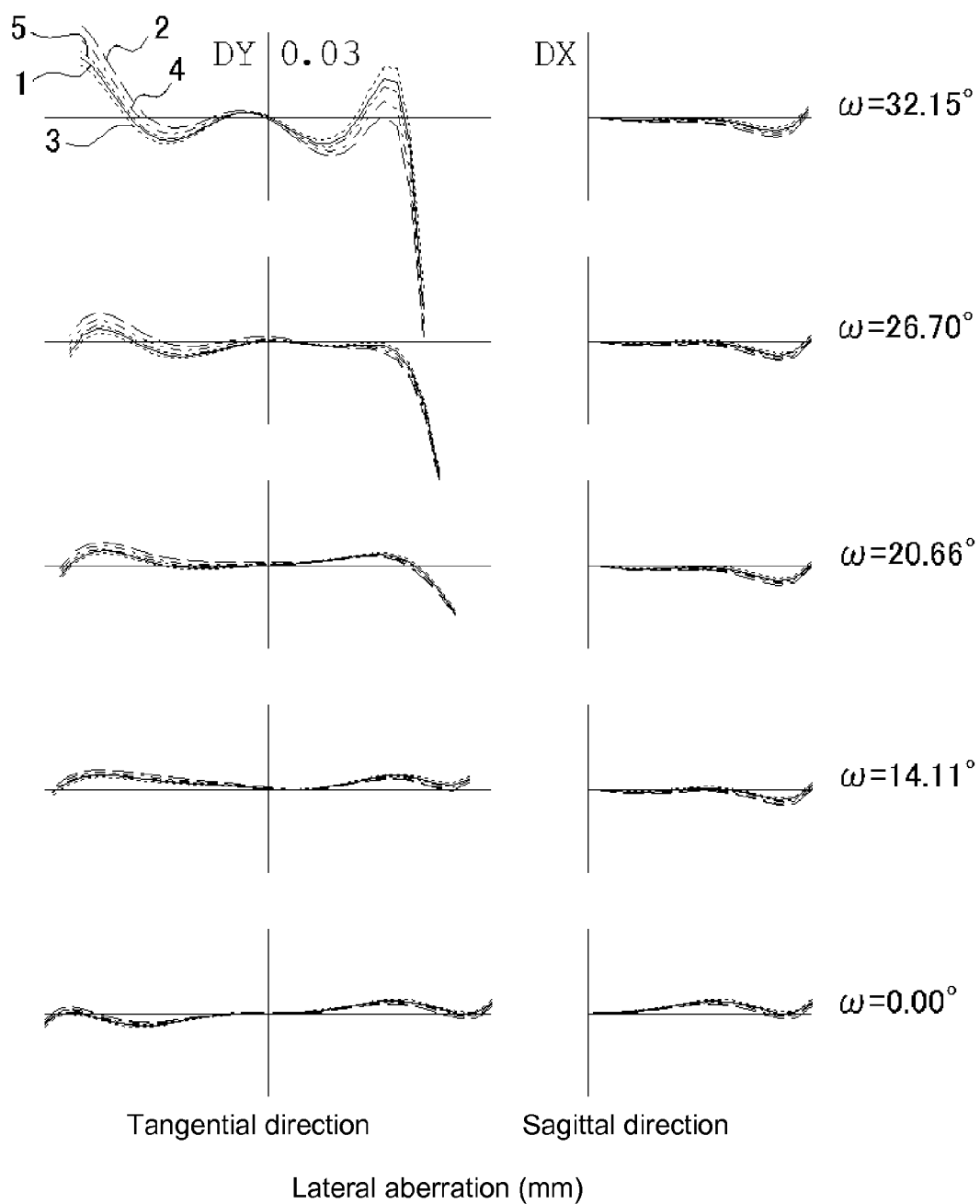
FIG. 8 is an aberration diagram showing a lateral aberration of the imaging lens in FIG. 7.
Figure 9:
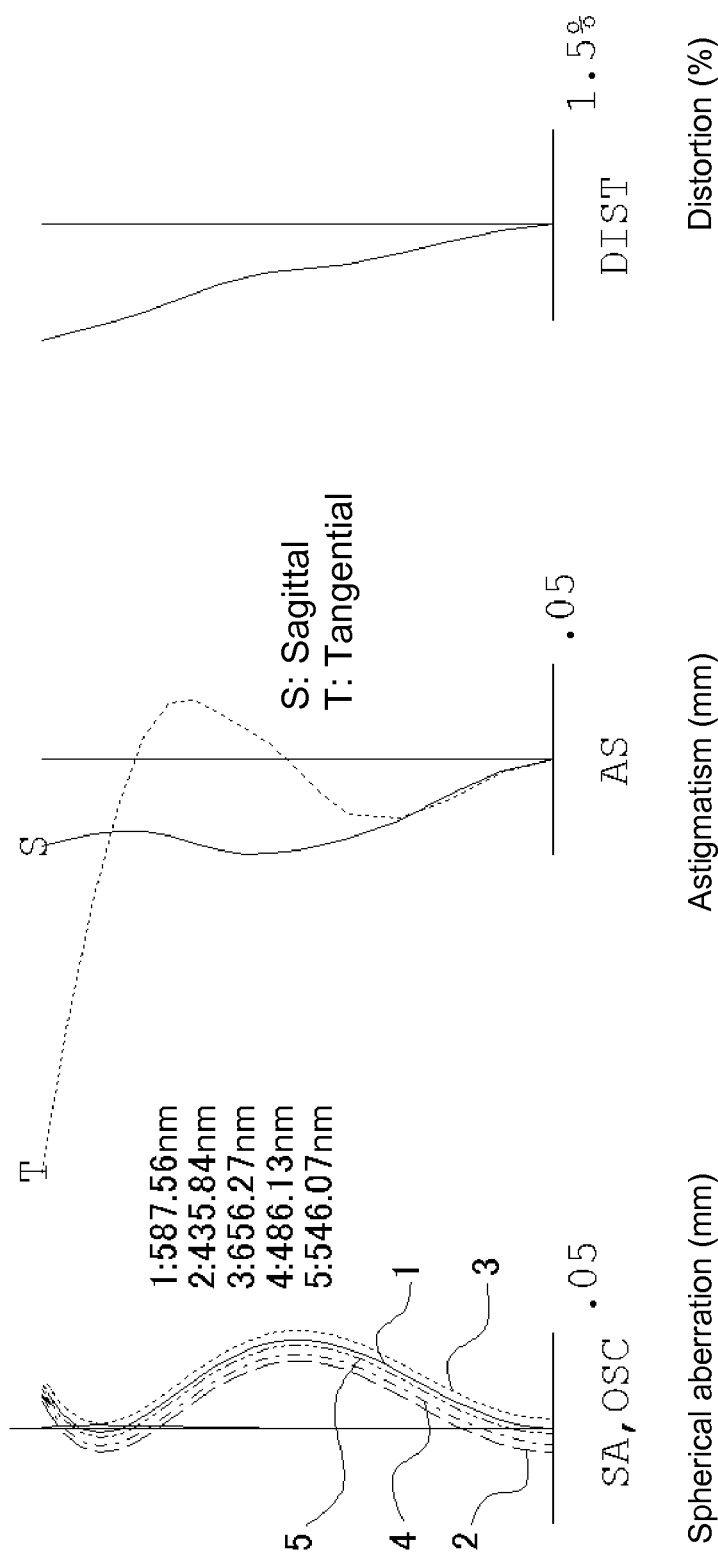
FIG. 9 is an aberration diagram showing a spherical aberration, an astigmatism, and a distortion of the imaging lens in FIG. 7.

FIG. 8 shows the lateral aberration that corresponds to the half angle of view ω in the imaging lens of Numerical Data Example 3, and FIG. 9 shows the spherical aberration SA (mm), the astigmatism AS (mm), and the distortion DIST (%), respectively. As shown in FIGS. 8 and 9, in the imaging lens of Numerical Data Example 3, the respective aberrations are satisfactorily corrected similarly to Numerical Data Example 1. In addition, the distance from a surface of the first lens L1 on the object side to the image plane is 3.166 mm in air, and therefore the size of the imaging lens is suitably reduced.

Second Embodiment

Hereunder, referring to the accompanying drawings, a second embodiment of the invention will be fully described.

In the imaging lens according to the embodiment, the refractive power of the third lens L3 is negative, which is different from the imaging lens of the first embodiment.

Figure 10:
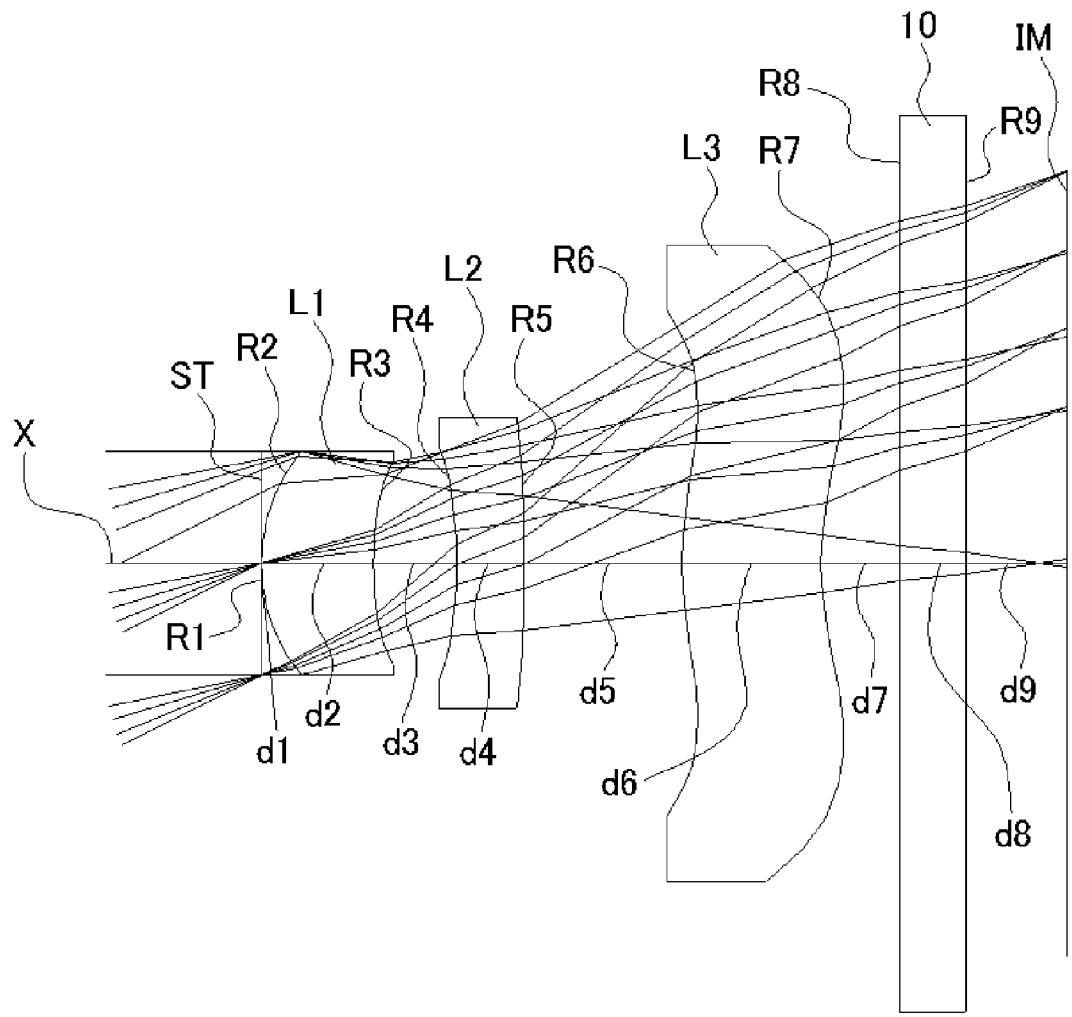
FIG. 10 is a schematic sectional view showing a configuration of an imaging lens in Numerical Data Example 4.
Figure 13:
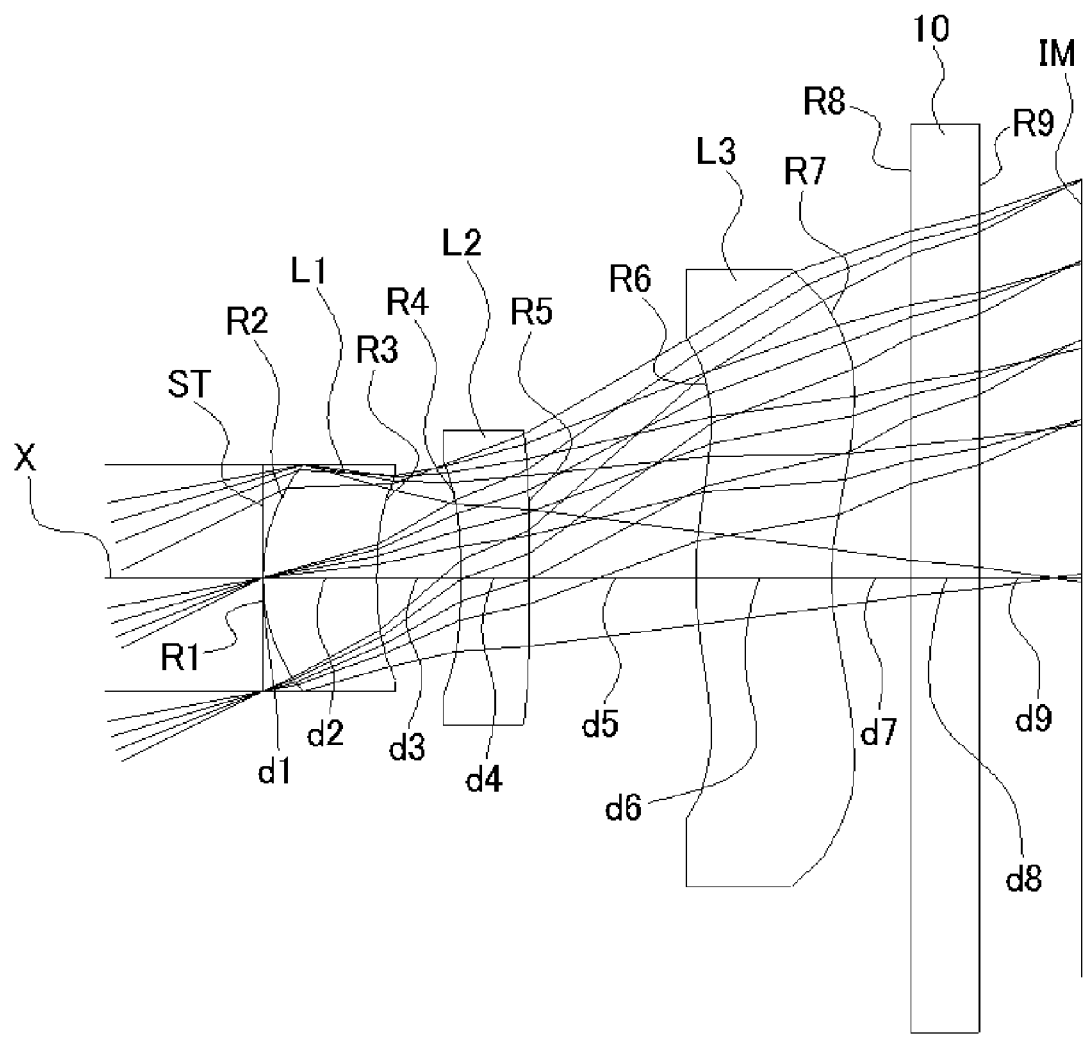
FIG. 13 is a schematic sectional view showing a configuration of an imaging lens in Numerical Data Example 5.

FIGS. 10 and 13 are schematic sectional views showing imaging lenses in Numerical Data Examples 4 and 5 according to the embodiment, respectively. Since a basic lens configuration is the same among the Numerical Data Examples 4 and 5, the lens configuration of the embodiment will be described with reference to the lens sectional view of Numerical Data Example 4.

As shown in FIG. 10, the imaging lens of the embodiment has an aperture stop ST; a first lens L1 having positive refractive power; a second lens L2 having negative refractive power; and a third lens L3 having negative refractive power, which are arranged in this order from an object side towards an image side of the imaging lens. A cover glass 10 is provided between the third lens L3 and an image plane IM of an imaging element. It is noted that the cover glass 10 may be optionally omitted.

The first lens L1 is formed in a shape so that both a curvature radius of a surface thereof on the object side and a curvature radius of a surface thereof on the image side are positive, i.e., it is shaped to form a meniscus lens that directs a convex surface to the object side neat the optical axis X. The second lens L2 is formed in a shape so that a curvature radius of a surface thereof on the object side is negative and a curvature radius of a surface thereof on the image side is positive, i.e., it is shaped to form a biconcave lens near the optical axis X. The third lens L3 is formed in a shape so that both the curvature radius of a surface thereof on the object side and a curvature radius of a surface thereof on the image side are positive, i.e., it is shaped to form a meniscus lens that directs a convex surface to the object side near the optical axis X. Here, the third lens L3 has a aspheric shape, in which both the surface on the object side and the surface on the image side are convex on the object side near the optical axis X and has a concave shape on the object side at a periphery of thereof.

If the whole lens system has a focal length f, the first lens L1 has a focal length f1, the second lens L2 has a focal length f2, the third lens L3 has a focal length f3, the composite focal length of the second lens L2 and the third lens L3 is f23, the curvature radius of a surface of the second lens L2 on the object side is Rf, the curvature radius of a surface of the second lens L2 on the image side is Rr, the distance between the first lens L1 and the second lens L2 on an optical axis is dA, and the distance between the second lens L2 and the third lens L3 on an optical axis is dB, the imaging lens of the embodiment satisfies the following conditional expressions:

$$f1 < |f2| \quad (1)$$

$$f1 < |f3| \quad (2)$$

$$0.5 < f1/f < 1.0 \quad (3)$$

$$0.5 < f23/f3 < 1.2 \quad (4b)$$

$$-1.0 < f1/f2 < -0.5 \quad (5)$$

$$-0.30 < Rf/Rr < 0 \quad (6)$$

$$0.25 < dA/dB < 0.7 \quad (7)$$

$$0.3 < dA/dB < 0.65 \quad (7A)$$

Here, it is not necessary to satisfy all of the conditional expressions (1) to (7A). When any single one of the conditional expressions (1) to (7A) is individually satisfied, it is possible to obtain an effect corresponding to the respective conditional expression. Further, it is possible to configure a small-sized imaging lens, in which the aberrations are satisfactorily corrected, in comparison with a conventional imaging lens.

Numerical Data Example 4

Basic lens data are shown below.

| f = 3.621 mm, Fno = 3.625, ω = 25.79° | | | | |
|---|---|---|---|---|
| Surface data | | | | |
| | | | | Unit: mm |
| Surface number i | R | d | Nd | vd |
| (Object) | ∞ | ∞ | | |
| 1 (Stop) | ∞ | 0.0000 | | |
| 2* | 0.817 | 0.5000 | 1.52470 | 56.2 |
| 3* | 1.651 | 0.3694 (=dA) | | |
| 4* | -3.006 (=Rf) | 0.3000 | 1.61420 | 26.0 |
| 5* | 15.697 (=Rr) | 0.7083 (=dB) | | |
| 6* | 1.620 | 0.6200 | 1.61420 | 26.0 |
| 7* | 1.380 | 0.3500 | | |
| 8 | ∞ | 0.3000 | 1.51633 | 64.2 |
| 9 | ∞ | 0.4400 | | |
| (Image Plane IM) | ∞ | | | |

| Aspheric Surface Data |
|---|
| Second Surface |
| k = 9.156504E-01, $A_4$ = -2.001875E-01, $A_6$ = 1.385200E-01, $A_8$ = -4.868637E-01, $A_{10}$ = -7.798491 |
| Third Surface |
| k = -3.106284, $A_4$ = 4.166545E-01, $A_6$ = -6.228740E-02, $A_8$ = 6.554742, $A_{10}$ = -1.423451E+01, $A_{12}$ = 5.774142E+01 |
| Fourth Surface |
| k = 2.224686E+01, $A_4$ = -6.057120E-01, $A_6$ = 2.680953, $A_8$ = -1.045722E+01, $A_{10}$ = 2.191227E+01, $A_{12}$ = -1.356551E+01 |
| Fifth Surface |
| k = 0.000000, $A_4$ = -7.601373E-01, $A_6$ = 3.334531, $A_8$ = -9.723123, $A_{10}$ = 1.683559E+01, $A_{12}$ = -1.501090E+01, $A_{14}$ = 5.837649 |
| Sixth surface |
| k = -1.035029E+01, $A_4$ = -1.045628E-01, $A_6$ = -2.940384E-01, $A_8$ = 2.507408E-01, | f = 3.621 mm, Fno = 3.625, ω = 25.79°
Surface data $A_{10} = 1.091151E-01, A_{12} = -1.173489E-01,$
$A_{14} = -1.263306E-01, A_{16} = 9.209900E-02$
Seventh Surface $k = -1.189318E-01, A_4 = -4.099832E-01,$
$A_6 = 7.581204E-02, A_8 = -4.964783E-03,$
$A_{10} = 5.659021E-03, A_{12} = -1.126572E-02,$
$A_{14} = 3.011777E-03, A_{16} = -4.222558E-04$ The focal lengths f1 to f3 of the respective lenses L1 to L3 and the composite focal length of the second lens L2 and the third lens L3 are as follows:

f1=2.555
f2=−4.083
f3=−889.682
f23=−3.470

The values of the respective conditional expressions (3) to (7A) are as follows:

$f1/f=0.706$ (3)

$f23/f3=0.850$ (4b)

$f1/f2=-0.626$ (5)

$Rf/Rr=-0.192$ (6)

$dA/dB=0.522$ (7),(7A)

Accordingly, the imaging lens of Numerical Data Example 4 satisfies the conditional expressions (1) to (7A).

Figure 11:
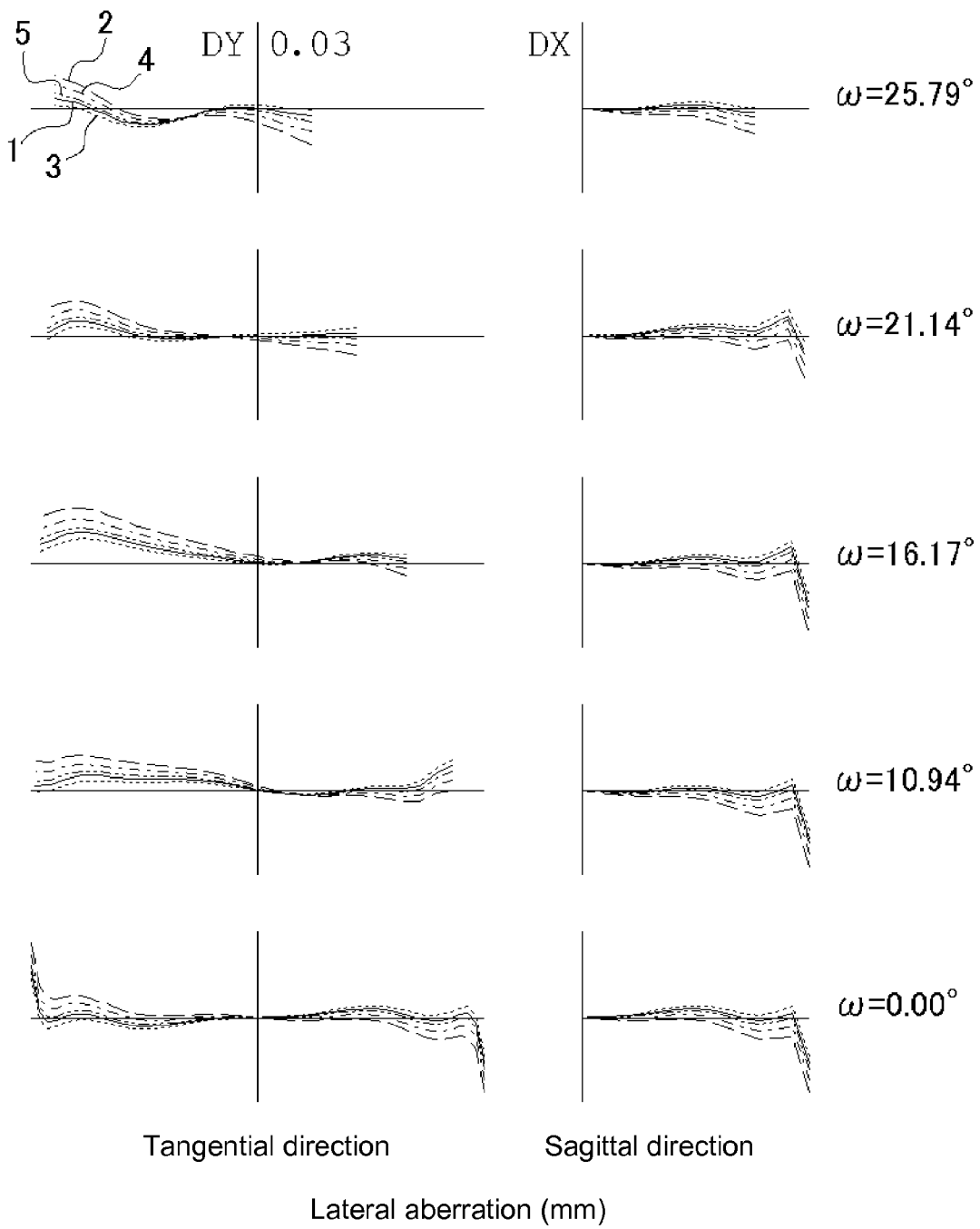
FIG. 11 is an aberration diagram showing a lateral aberration of the imaging lens in FIG. 10.
Figure 12:
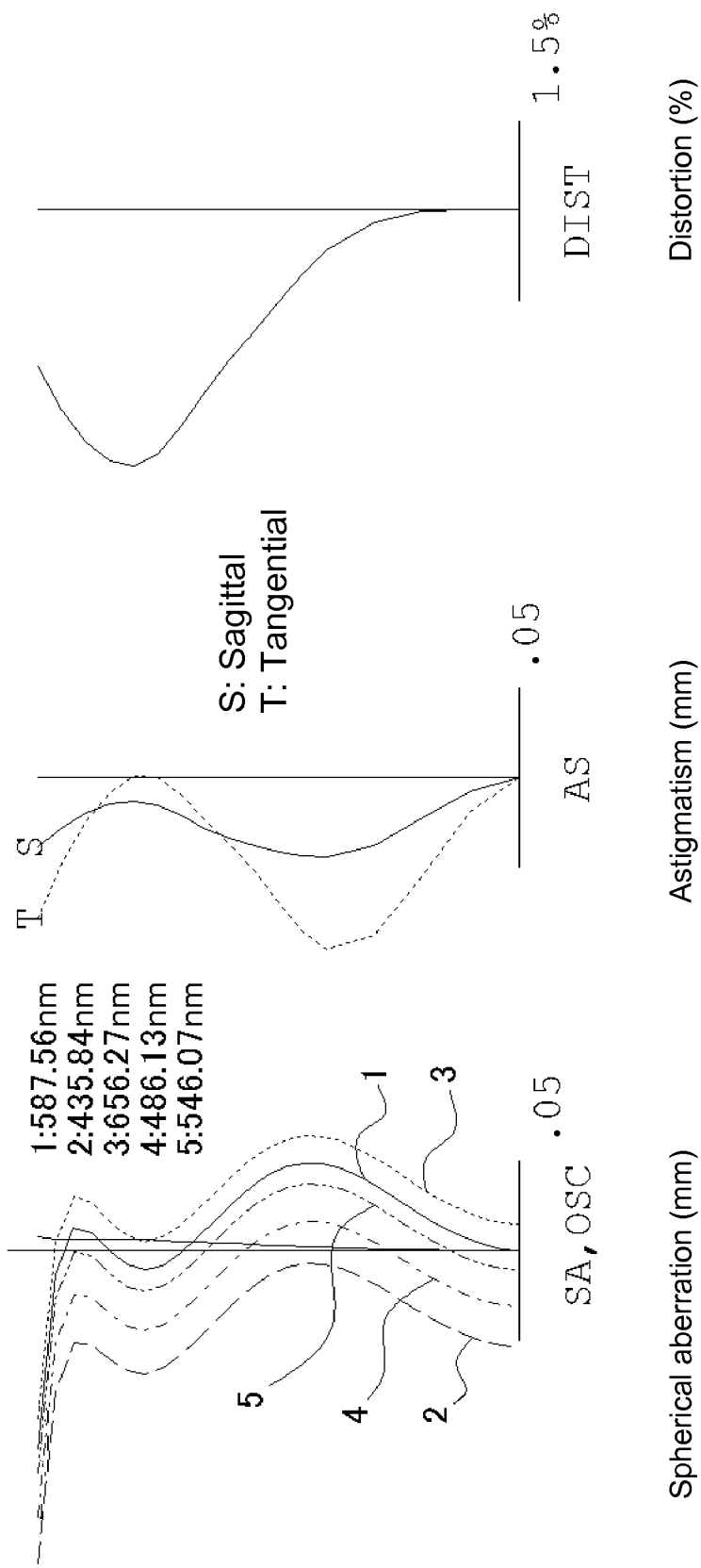
FIG. 12 is an aberration diagram showing a spherical aberration, an astigmatism, and a distortion of the imaging lens in FIG. 10.

FIG. 11 shows the lateral aberration that corresponds to the half angle of view ω in the imaging lens of Numerical Data Example 4, and FIG. 12 shows the spherical aberration SA (mm), the astigmatism AS (mm), and the distortion DIST (%), respectively. As shown in FIGS. 11 and 12, in the imaging lens of the Numerical Data Example 4, the respective aberrations are satisfactorily corrected. In addition, a distance from the surface of the first lens L1 on the object side to the image plane is 3.486 mm in air, and therefore the size of the imaging lens is suitably reduced.

Numerical Data Example 5
Basic lens data are shown below.

f = 3.628 mm, Fno = 3.630, ω = 25.79°
Surface Data

Unit: mm

| Surface number i | R | d | Nd | vd |
|---|---|---|---|---|
| (Object) | ∞ | ∞ | | |
| 1 (Stop) | ∞ | 0.0000 | | |
| 2* | 0.822 | 0.5000 | 1.52470 | 56.2 |
| 3* | 1.689 | 0.3710 (=dA) | | |
| 4* | −3.009 (=Rf) | 0.3000 | 1.61420 | 26.0 |
| 5* | 15.420 (=Rr) | 0.7326 (=dB) | | |
| 6* | 1.620 | 0.6000 | 1.61420 | 26.0 |
| 7 | 1.380 | 0.3500 | | |
| 8 | ∞ | 0.3000 | 1.51633 | 64.2 |
| 9 | ∞ | 0.4390 | | |
| (Image Plane IM) | ∞ | | | | f = 3.628 mm, Fno = 3.630, ω = 25.79°
Surface Data

Aspheric Surface Data

Second Surface $k = 9.364151E-01, A_4 = -1.986518E-01,$
$A_6 = 1.380496E-01, A_8 = -4.787480E-01,$
$A_{10} = -7.872170$
Third Surface $k = -3.087456, A_4 = 4.160485E-01,$
$A_6 = -6.131399E-02, A_8 = 6.229271,$
$A_{10} = -1.425891E+01, A_{12} = 5.609518E+01$
Fourth Surface $k = 2.222221E+01, A_4 = -6.004975E-01,$
$A_6 = 2.685851, A_8 = -1.048226E+01,$
$A_{10} = 2.188325E+01, A_{12} = -1.370214E+01$
Fifth surface $k = 0.000000, A_4 = -7.592701E-01,$
$A_6 = 3.334627, A_8 = -9.723934,$
$A_{10} = 1.684345E+01, A_{12} = -1.501855E+01,$
$A_{14} = 5.845048$
Sixth Surface $k = -1.035886E+01, A_4 = -1.046718E-01,$
$A_6 = -3.007844E-01, A_8 = 2.495829E-01,$
$A_{10} = 1.103298E-01, A_{12} = -1.185574E-01,$
$A_{14} = -1.270811E-01, A_{16} = 9.251858E-02$
Seventh Surface $k = -1.182990E-01, A_4 = -4.108258E-01,$
$A_6 = 7.541289E-02, A_8 = -4.932627E-03,$
$A_{10} = 5.622894E-03, A_{12} = -1.129859E-02,$
$A_{14} = 3.010675E-03, A_{16} = -4.223644E-04$ The focal lengths f1 to f3 of the respective lenses L1 to L3 and the composite focal length f23 of the second lens L2 and the third lens L3 are as follows:

f1=2.547
f2=−4.074
f3=−311.068
f23=−3.448

The values of the respective conditional expressions (3) to (7A) are as follows:

$f1/f=0.702$ (3)

$f23/f3=0.846$ (4b)

$f1/f2=-0.625$ (5)

$Rf/Rr=-0.195$ (6)

$dA/dB=0.506$ (7),(7A)

Accordingly, the imaging lens of Numerical Data Example 5 satisfies the conditional expressions (1) to (7A).

Figure 14:
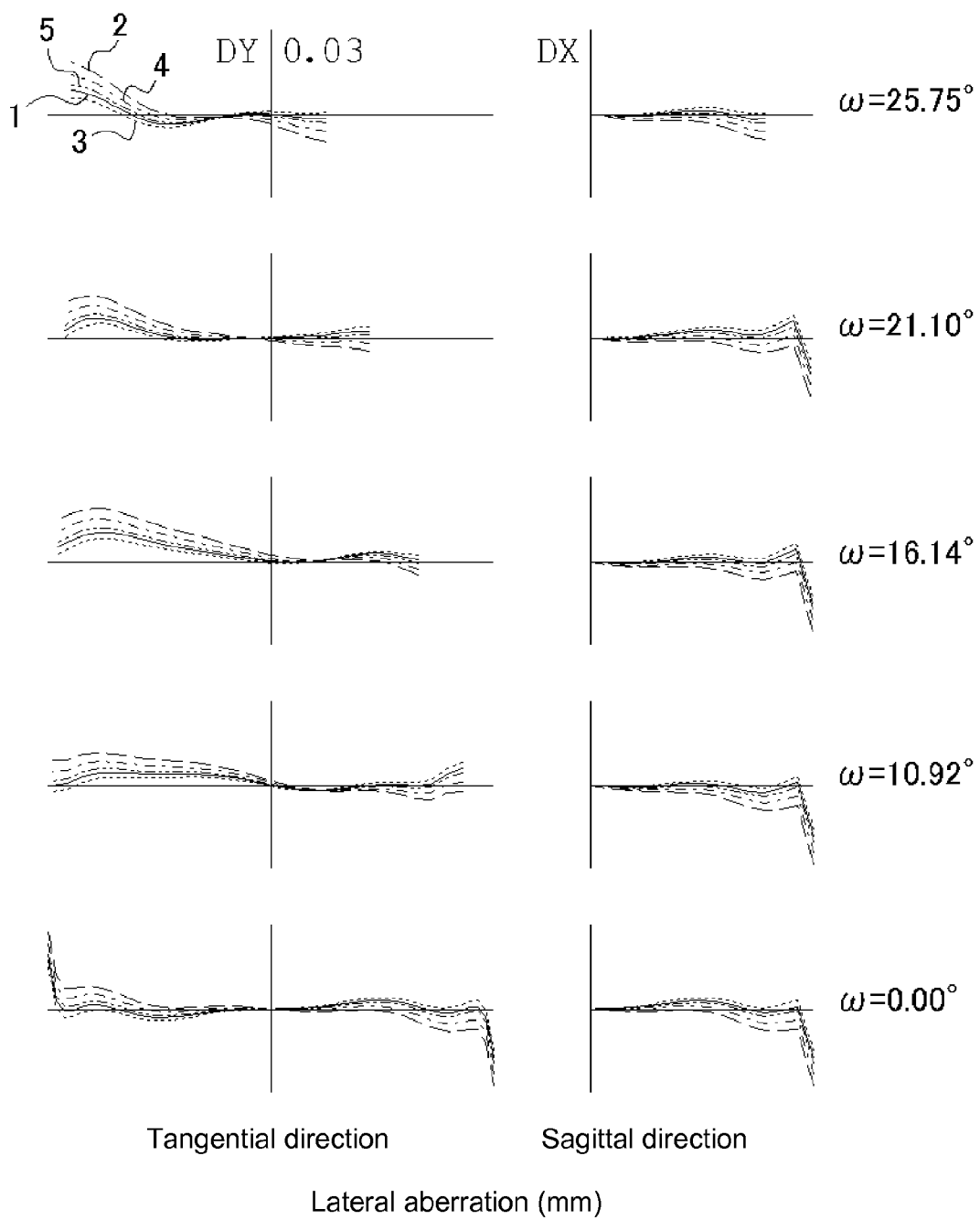
FIG. 14 is an aberration diagram showing a lateral aberration of the imaging lens in FIG. 13.
Figure 15:
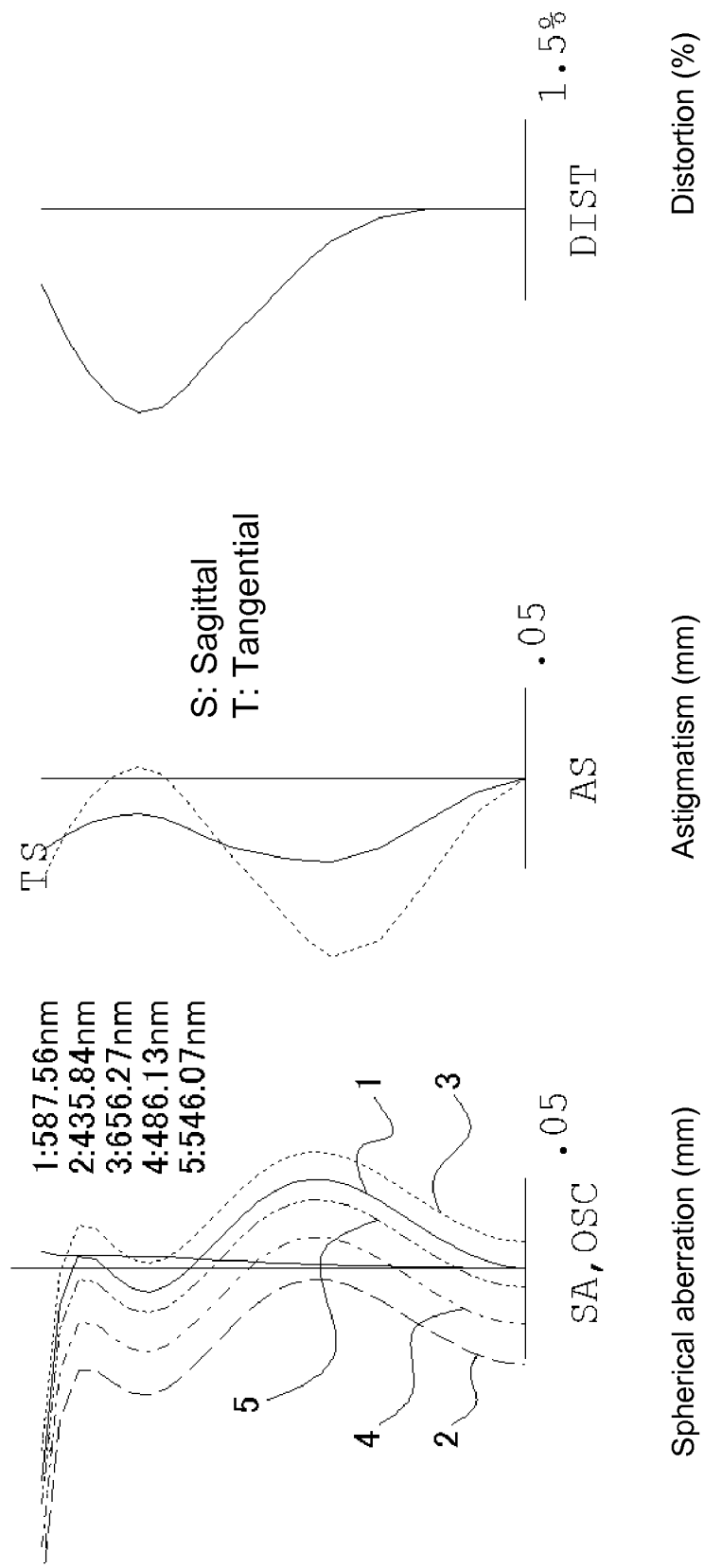
FIG. 15 is an aberration diagram showing a spherical aberration, an astigmatism, and a distortion of the imaging lens in FIG. 13.

FIG. 14 shows the lateral aberration that corresponds to the half angle of view ω in the imaging lens of Numerical Data Example 5, and FIG. 15 shows the spherical aberration SA (mm), the astigmatism AS (mm), and the distortion DIST (%), respectively. As shown in FIGS. 14 and 15, in the imaging lens of Numerical Data Example 5, the respective aberrations are satisfactorily corrected. In addition, the distance from the surface of the first lens L1 on the object side to the image plane is 3.490 mm in air, and therefore the size of the imaging lens is suitably reduced.

Accordingly, when the imaging lens of the respective embodiments is applied to an imaging optical system of a cellular phone, a digital still camera, a portable information terminal, a security camera, an onboard camera, a network camera, and the like, it is possible to achieve the high performance and the small size for the camera or the like.

Here, it is noted that the imaging lens of the invention shall not be limited to the above-described embodiments. In the above embodiments, the surfaces of the first lens L1 through the third lens L3 have the aspheric surfaces, and it is not necessary that all have the aspheric surfaces. For example, one surface or both surfaces of the second lens L2 may be formed to be spherical.

The invention may be applicable to the imaging lens of a device that is required to have a small size and satisfactory aberration correction ability, e.g., the imaging lenses used in the cellular phones, the digital still cameras, and the like.

What is claimed is:

1. An imaging lens comprising:
a first lens having positive refractive power;
a second lens having negative refractive power; and
a third lens arranged in this order from an object side to an image side,
wherein said first lens is formed in a shape so that both a curvature radius of a surface thereof on the object side and a curvature radius of a surface thereof on the image side are positive,
said second lens is formed in a shape so that a curvature radius of a surface thereof on the object side is negative and a curvature radius of a surface thereof on the image side is positive,
said third lens is formed in a shape so that both a curvature radius of a surface thereof on the object side and a curvature radius of a surface thereof on the image side are positive, and
a whole lens system has a focal length f, said first lens has a focal length f1, said second lens has a focal length f2, and said third lens has a focal length f3 so that the following conditional expressions are satisfied:

$f1 < |f2|$ $f1 < |f3|$ $0.5 < f1/f < 1.0$ said first lens, said second lens, and said third lens are arranged so that a distance between the first lens and the second lens on an optical axis is dA and a distance between the second lens and the third lens on the optical axis is dB, and the following conditional expression is satisfied:

$0.25 < dA/dB < 0.7$.

2. The imaging lens according to claim 1, wherein said third lens has positive refractive power and said second lens and said third lens has a composite focal length f23 so that the following conditional expression is satisfied:

$-1.5 < f23/f3 < -0.8$.

3. The imaging lens according to claim 1, wherein said third lens has negative refractive power, said third lens has the focal length f3, and said second lens and said third lens have a composite focal length f23 so that the following conditional expression is satisfied:

$0.5 < f23/f3 < 1.2$.

4. The imaging lens according to claim 1, wherein said second lens has the surface on the object side having a curvature radius Rf and the surface on the image side having a curvature radius Rr so that the following conditional expression is satisfied:

$-0.30 < Rf/Rr < 0$.

5. The imaging lens according to claim 4, wherein said third lens has positive refractive power, said third lens has the focal length f3, and the composite focal length of said second lens and said third lens is f23 so that the following conditional expression is satisfied:

$-1.5 < f23/f3 < -0.8$.

6. The imaging lens according to claim 4, wherein said third lens has negative refractive power, said third lens has the focal length f3, and said second lens and said third lens has a composite focal length f23 so that the following conditional expression is satisfied:

$0.5 < f23/f3 < 1.2$.

7. The imaging lens according to claim 1, wherein said first lens has the focal length f1, said second lens has the focal length f2 so that the following conditional expression is satisfied:

$-1.0 < f1/f2 < -0.5$.

8. The imaging lens according to claim 7, wherein said second lens has the surface on the object side having a curvature radius Rf and the surface on the image side having a curvature radius Rr so that the following conditional expression is satisfied:

$-0.30 < Rf/Rr < 0$.

9. The imaging lens according to claim 7, wherein said third lens has positive refractive power, said third lens has the focal length f3, and the composite focal length of said second lens and said third lens is f23 so that the following conditional expression is satisfied:

$-1.5 < f23/f3 < -0.8$.

10. The imaging lens according to claim 7, wherein said third lens has negative refractive power, said third lens has the focal length f3, and said second lens and said third lens has a composite focal length f23 so that the following conditional expression is satisfied:

$0.5 < f23/f3 < 1.2$.

11. An imaging lens comprising:
a first lens having positive refractive power;
a second lens having negative refractive power; and
a third lens arranged in this order from an object side to an image side;
wherein said first lens is formed in a shape so that both a curvature radius of a surface thereof on the object side and a curvature radius of a surface thereof on the image side are positive,
said second lens is formed in a shape so that a curvature radius of a surface thereof on the object side is negative and a curvature radius of a surface thereof on the image side is positive,
said third lens is formed in a shape so that both a curvature radius of a surface thereof on the object side and a curvature radius of a surface thereof on the image side are positive,
a whole lens system has a focal length f, said first lens has a focal length f1, said second lens has a focal length f2, and said third lens has a focal length f3 so that the following conditional expressions are satisfied:

$f1<|f2|$ $f1<|f3|$ $0.5<f1/f<1.0$ said third lens has positive refractive power, and
said second lens and said third lens has a composite focal length f23 so that the following conditional expression is satisfied:

$-1.5<f23/f3<-0.8$.

12. The imaging lens according to claim 11, wherein said second lens has the surface on the object side having a curvature radius Rf and the surface on the image side having a curvature radius Rr so that the following conditional expression is satisfied:

$-0.30<Rf/Rr<0$.

13. The imaging lens according to claim 11, wherein said first lens has the focal length f1, said second lens has the focal length f2 so that the following conditional expression is satisfied:

$-1.0<f1/f2<-0.5$.

14. The imaging lens according to claim 13, wherein said second lens has the surface on the object side having a curvature radius Rf and the surface on the image side having a curvature radius Rr so that the following conditional expression is satisfied:

$-0.30<Rf/Rr<0$.

15. An imaging lens comprising:
a first lens having positive refractive power;
a second lens having negative refractive power; and
a third lens arranged in this order from an'object side to an image side,
wherein said first lens is formed in a shape so that both a curvature radius of a surface thereof on the object side and a curvature radius of a surface thereof on the image side are positive,
said second lens is formed in a shape so that a curvature radius of a surface thereof on the object side is negative and a curvature radius of a surface thereof on the image side is positive,
said third lens is formed in a shape so that both a curvature radius of a surface thereof on the object side and a curvature radius of a surface thereof on the image side are positive,
a whole lens system has a focal length f, said first lens has a focal length f1, said second lens has a focal length f2, and said third lens has a focal length f3 so that the following conditional expressions are satisfied:

$f1<|f2|$ $f1<|f3|$ $0.5<f1/f<1.0$ said third lens has negative reflective power, and
said third lens has the focal length f3, and said second lens and said third lens have a composite focal length f23 so that the following conditional expression is satisfied:

$0.5<f23/f3<1.2$.

16. The imaging lens according to claim 15, wherein said second lens has the surface on the object side having a curvature radius Rf and the surface on the image side having a curvature radius Rr so that the following conditional expression is satisfied:

$-0.30<Rf/Rr<0$.

17. The imaging lens according to claim 15, wherein said first lens has the focal length f1, said second lens has the focal length f2 so that the following conditional expression is satisfied:

$-1.0<f1/f2<-0.5$.

18. The imaging lens according to claim 17, wherein said second lens has the surface on the object side having a curvature radius Rf and the surface on the image side having a curvature radius Rr so that the following conditional expression is satisfied:

$-0.30<Rf/Rr<0$.

* * * * *